US008839042B2

(12) United States Patent
Bromley et al.

(10) Patent No.: US 8,839,042 B2
(45) Date of Patent: Sep. 16, 2014

(54) DYNAMIC LOAD CALCULATION AND PREDICTIVE SCALING

(75) Inventors: Cameron David Bromley, Hampton (AU); John Joseph Michelsen, III, Arlington, TX (US); Ricardo Emilio Denis, Round Rock, TX (US)

(73) Assignee: CA, Inc., Islandia, NY (US)

( * ) Notice: Subject to any disclaimer, the term of this patent is extended or adjusted under 35 U.S.C. 154(b) by 179 days.

(21) Appl. No.: 13/601,499

(22) Filed: Aug. 31, 2012

(65) Prior Publication Data
US 2014/0068335 A1  Mar. 6, 2014

(51) Int. Cl.
*G06F 11/00*  (2006.01)
(52) U.S. Cl.
USPC ............................................ 714/41; 714/47.1
(58) Field of Classification Search
CPC .......................... G06F 11/3457; G06F 11/3414
USPC ............................. 714/41, 32, 47.1, 47.2, 47.3
See application file for complete search history.

(56) References Cited

U.S. PATENT DOCUMENTS

| | | | | |
|---|---|---|---|---|
| 5,812,780 A * | 9/1998 | Chen et al. | ...................... | 709/224 |
| 5,956,662 A * | 9/1999 | Hemker et al. | ................ | 702/182 |
| 5,974,572 A * | 10/1999 | Weinberg et al. | ............. | 714/47.2 |
| 6,249,886 B1 * | 6/2001 | Kalkunte | ...................... | 714/47.3 |
| 2002/0161553 A1 * | 10/2002 | Har'El et al. | .................. | 702/186 |

* cited by examiner

*Primary Examiner* — Dieu-Minh Le
(74) *Attorney, Agent, or Firm* — Baker Botts, L.L.P.

(57) ABSTRACT

A system, apparatus, method, and computer program product for dynamically loading IT products and scaling those loads in a predictive manner are disclosed. Dynamic loading and scaling is performed by generating a load on a computing product with one or more first load generators, increasing the load over time until the first load generators reach their capacity for generating load, monitoring the capacity of the first load generators as the load is increased, provisioning one or more second load generators to generate additional load as any of the first load generators approaches its capacity, increasing the load generated by the second load generators over time until the one or more second load generators reach their capacity for generating load or the computing product reaches a performance goal, and continuing to provision second load generators until the computing product reaches the performance goal.

21 Claims, 3 Drawing Sheets

DYNAMIC LOAD CALCULATION AND PREDICTIVE SCALING

BACKGROUND

The present disclosure generally relates to load testing IT products. The disclosed embodiments relate more specifically to a system, apparatus, method, and computer program product for dynamically loading IT products and scaling those loads in a predictive manner.

In the information technology (IT) industry, the term "load testing" generally refers to the practice of modeling the expected usage of an IT product (e.g., an application, a website, a virtual machine, a server, etc.) by simulating multiple consumers accessing that IT product concurrently. Such load testing typically is utilized to measure an IT product's quality of service (QoS) performance with simulated consumer behavior prior to releasing the IT product for consumption by actual consumers. Such consumers may included, for example, a real person or another computing device. And by load testing the IT product in that way, the IT product provider may ensure that the IT product will function properly when it is released for consumption by those consumers.

Consumer behavior may be simulated by having live and/or virtual users access the IT product and mimic the behavior of real person consumers. For example, the IT product provider may procure a large number of computing devices that are configured to access the IT product (e.g., desktop computers, laptop computers, tablet computers, smart phones, etc.) and recruit a corresponding number of live users to begin accessing the IT product with those computing devices. Those live users then would engage in various interactions with the IT product that mimic the types of interactions expected to be made with the IT product by real persons consuming the services of the IT product.

In the foregoing example, the number of computing devices that must be procured generally corresponds to the number of consumers for which the IT product provider would like to simulate the subject consumer behavior. Thus, to simulate the behavior of a thousand (1,000) consumers, the IT product provider would be required to procure a thousand (1,000) computing devices that are configured to access the IT product. Moreover, the IT product provider also would be required to recruit a corresponding number of users to operate those computing devices to simulate the subject consumer behavior. Such a task presents a significant logistical challenge, which grows more and more difficult to address as the number of consumers for which the IT product provider would like to simulate the subject The foregoing logistical challenge may be partially addressed by provisioning a plurality computing devices load generating software that executes various scripts that mimic the types of interactions expected to be made with the IT product by real persons and/or other computing devices (e.g., LISA brand load generating software from CA Technologies. LOADRUNNER brand load generating software from Hewlett-Packard, WEBLOAD brand load generating software from RadView Software, etc.). Such load generating software allows a plurality of virtual users to be invoked at each load generating computing device, rather than providing a single live user at each such computing device, thereby reducing the number of computing devices required to conduct a load test. It also may allow a plurality of other computing devices to be emulated at each load generating computing device. Nevertheless, it remains difficult for test engineers to predict the number of virtual users that can be invoked at each load generating computing device because that number varies based on the nature of the test, the hardware employed on the computing device, and/or the type of other computing device being emulated. It is similarly difficult for test engineers to predict the number of instances of virtual users that will be required to satisfactorily test the subject IT product. Accordingly, test engineers often over-allocate or under-allocate resources for a particular load test, which results in the inefficient duplication of time and effort to set up and re-run a new load test when the initial load test fails.

For example, a test engineer may believe that a particular IT product will reach a predefined performance goal (e.g., CPU usage, memory usage, disk I/O, response time, throughput, etc.) when concurrently accessed by thirty thousand (30,000) real person consumers. The test engineer also may believe that each computing device may simulate one thousand (1,000) of those real person consumers. Accordingly, the test engineer would provision thirty (30) computing devices with load generating software for use in running the load test.

Such provisioning may involve installing the load generating software on the computing devices of various employees of the IT product provider so that the IT product provider is not required to procure new computing devices just to run the load test. Nevertheless, to use the computing devices of those employees, the test engineer not only must install the load generating software when those computing devices are not being used by those employees (e.g., when the employees are on break or otherwise not working), he/she also must run the load test for longer periods when those computing devices are not being used (e.g., after regular work hours). And when the test engineer incorrectly guesses the number consumers required to reach the predefined performance goal of the IT product and/or the number of consumers that may be simulated with each computing device, the predefined performance goal of the IT product may not be reached. The test engineer then would be required to repeat the preceding steps at least one more time until the load test is scaled properly, thereby duplicating timely work and consuming more resources.

BRIEF SUMMARY

The present disclosure is directed to system, apparatus, method, and computer program product for dynamically loading IT products and scaling those loads in a predictive manner. In a disclosed embodiment of the apparatus, the apparatus comprises one or more processors that are configured to execute computer-readable program code to generate a load on a computing product with one or more first load generators; to increase the load generated by the one or more first load generators over time until the one or more first load generators reach their capacity for generating load; to monitor the capacity of the one or more first load generators to generate additional load as the load is increased; to provision one or more second load generators to generate additional load as any of the one or more first load generators approaches its capacity, but before that first load generator reaches its capacity; to increase the load generated by the one or more second load generators over time until the one or more second load generators reach their capacity for generating load or the computing product reaches a performance goal; and to continue to provision second load generators until the computing product reaches the performance goal.

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

Figure 1:
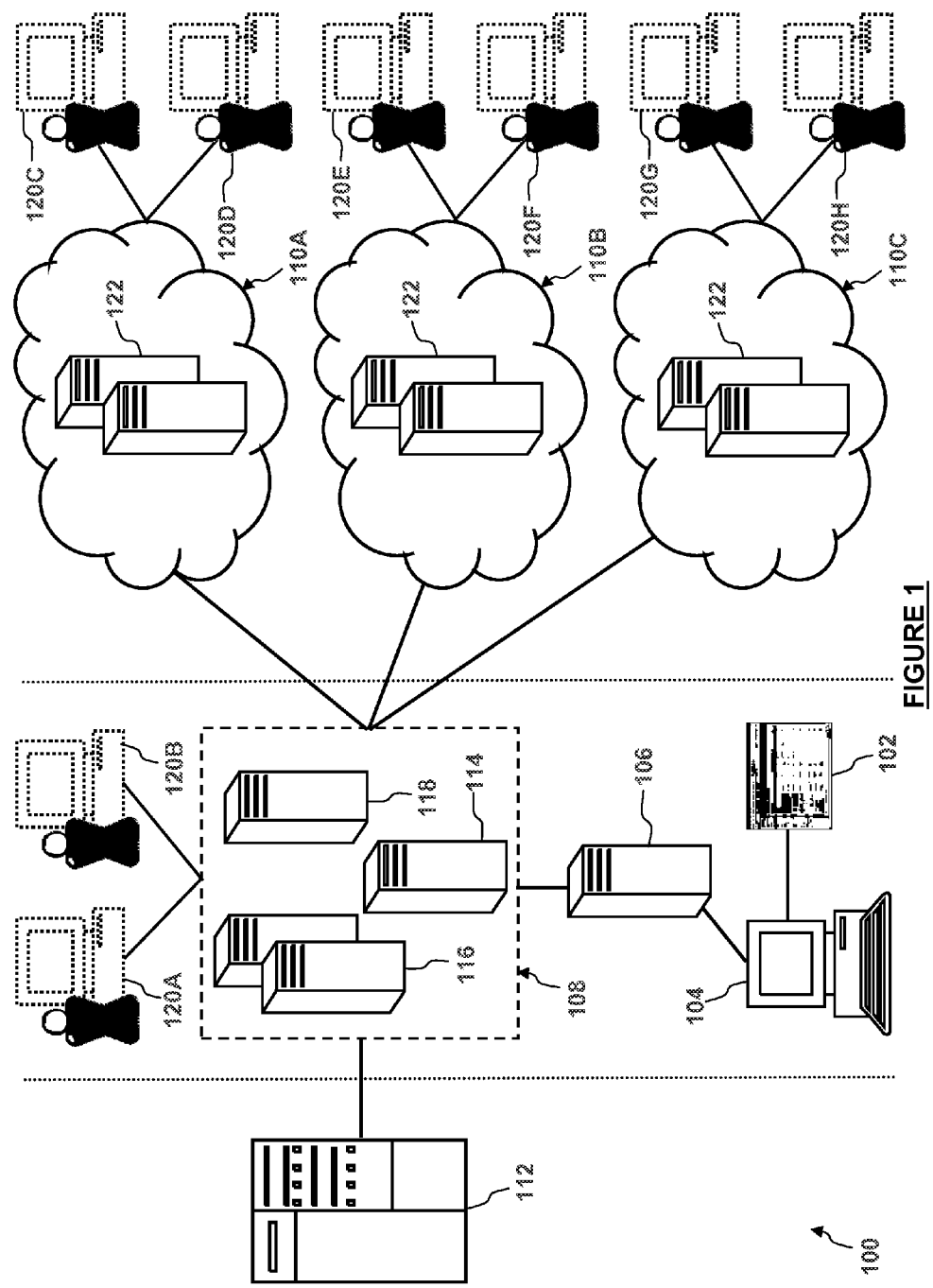
FIG. 1 is a schematic diagram illustrating an example of a load testing system according to a non-limiting embodiment of the present disclosure.

As will be appreciated by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, microcode, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The system, apparatus, method, and computer program product of the disclosed embodiments dynamically load IT products and scale those loads in a predictive manner. More particularly, the system, apparatus, method, and computer program product dynamically load an IT product by automatically adding and removing load to and from the IT product in a predictive manner utilizing cloud-based resources. And the system, apparatus, method, and computer program product scale the load in a predictive manner by predicting when a particular cloud resource will run out of capacity to satisfy the required load and by predicting how many more cloud resources will be required to satisfy that load, before the cloud resources currently being utilized reach their capacity. By predicting those limits and requirements in a pre-emptive manner, rather than reacting to them, the disclosed system, apparatus, method, and computer program product are able to provision additional cloud resources before they are actually needed so that a load testing system may be properly scaled to satisfy the required load without interrupting and/or repeating a load test. And by utilizing cloud-based resources to support such scaling, the disclosed system, apparatus, method, and computer program product are able to scale a load testing system to generate virtually any amount of load.

Turning to the drawings, FIG. 1 illustrates a load testing system 100 according to a non-limiting embodiment of the present disclosure. The load testing system 100 comprises a Development/Test Cloud Manager (DCM) portal 102, a lab management workstation 104, DCM server 106, a load test lab 108, a plurality of cloud services 110A-110C, and a service provider system 112 that are in electronic data communication with each other via one or more network connections. Those network connections may be any suitable wired or wireless connections that support electronic data communications between those devices 102-112, such as a LAN connection, a wireless LAN (WLAN) connection, a WAN connection, or a combination of two or more of those connections. And although only one (1) DCM portal 102, one (1) lab management workstation 104, one (1) DCM server 106, one (1) load test lab 108, three (3) cloud services 110A-110C, and one (1) service provider system 112 are depicted in FIG. 1, it should be understood that the load testing system 100 may include any number of any of those devices 102-112. For example, the load testing system 100 may comprise two (2) load test labs 108 and two (2) service provider systems 112 so that the two (2) different IT products on two (2) different service provider systems 112 may be load tested simultaneously. As yet another alternative, two (2) different IT products on two (2) different service provider systems 112 also may be tested simultaneously utilizing one (1) load test lab 108.

The DCM portal 102 is configured to provide a user interface via which a test engineer may access the different cloud services 110A-110C in the load testing system 100 and launch, manage, monitor, and shut down the load test lab 108 as required to conduct load tests on one or more IT products on the service provider system 112. Accordingly, the DCM portal 102 comprises a virtual lab manager (VLM) that is configured to operate on top of one or more hypervisors and/or Infrastructure as a Service (IaaS) providers in a software layer to manage the lifecycle of the load test lab 108. The DCM portal 102 further comprises a cloud support provider that is configured to operate in an abstraction layer to configure the load test lab 108 utilizing definitions supported by the VLM.

The lab management workstation 104 is configured to provide the test engineer with the tools required to access and implement the functionality of the DCM portal 102. And the lab management workstation 104 is configured to work in conjunction with the DCM server 106 to support that functionality, as described below. Accordingly, the lab management workstation 104 and the DCM server 106 each comprise a processor, a memory, and a network interface.

The processor may comprise any number of suitable CPUs that are configured to execute computer program code embodied on the memory to perform the various functions of the lab management workstation 104 and DCM server 106. The memory may comprise one or more types of memory (e.g., RAM, ROM, EPROM, magnetic storage device, etc.) that are configured to store the computer program code executed by the processor and to support the execution of that code. And the network interface may comprise any number of suitable interfaces (e.g., modems, mobile browsers, wireless Internet browsers, etc.) that are configured to support communications with and between the lab management workstation 104, the DCM server 106, and the various other devices 106-112 in the load testing system 100.

In addition to a processor, memory, and network interface, the lab management workstation 104 also may comprise an input device and an output device. The input device may comprise any number of suitable devices that are configured to receive input from a user (e.g., a keypad, a microphone, a touch screen, etc.). And the output device may comprise any number of suitable devices that are configured to output data to a user in a meaningful manner (e.g., a display, a printer, a speaker, etc.). Accordingly, the lab management workstation 104 may be, for example, a personal computer, a tablet computer, a personal digital assistant (PDA), a smartphone, or other similar device.

The load test lab 108 is configured to operate in conjunction with the cloud services 110A-110C to provide a hybrid cloud-based environment in which one or more IT products on the service provider system 112 may be tested. Accordingly, the load test lab 108 comprises a coordinator server 114, one or more simulator servers 116, and a virtual service environment (VSE) server 118. The coordinator server 114 is configured to monitor the resources being consumed on the simulator servers 116 and/or in the cloud services 110A-110C and to provision additional resources before they are required by analyzing the resource utilization that is being monitored. The simulator servers 116 are configured to apply a load to an IT product on the service provider system 112 by simulating the behavior of a plurality of consumers accessing that IT product. Such consumers may include real persons and/or other computing devices. And the VSE server 118 is configured to absorb and simulate the behavior of any components of the service provider system 112 that may be shared between two or more IT products so that the performance of any one of those IT products may be tested in isolation, without effecting the performance of any of the other IT products. The VSE server 118 also is configured to simulate any components of the service provider system 112 that may be needed to support the target IT product but that have not yet been built. The coordinator server 114, simulator servers 116, and VSE server 118 each may comprise a processor, memory, and network interface similar to those described above with respect to the lab management workstation 104 and the DCM server 106.

The simulator servers 116 are configured to simulate the behavior of a plurality of consumers by executing a plurality of virtual user, or vUser, scripts. Each simulator server 116 may execute a plurality of such scripts to invoke a plurality of instances of vUsers 120A and 120B. Each of those instances of vUsers 120A and 120B is configured to access and utilize the IT product in a manner that simulates the expected behavior of a real person consumer and/or another computing device so that a single simulator server 116 may simulate the behavior of a large number of consumers, thereby reducing the number of computing devices required to conduct a load test and eliminating the need for real persons and a large number of computing devices to perform the tasks required to simulate the expected behavior of real person consumers and/or other computing devices (e.g., inputting usernames and passwords, uploading/downloading data, navigating between web pages, etc.). When the coordinator server 114 determines that the simulator servers 116 will not be able to invoke enough instances of vUsers 120 to support the load required to satisfactorily complete a particular load test, the coordinator server 114 may begin provisioning additional vUsers 120C-120H on the cloud services 110A-110C.

Each of the cloud services 110A-110C comprises computing resources 122 (e.g., servers, databases, applications, virtual machines, etc.) and is configured to provide on-demand access to those computing resources 122 in a cloud-based environment. Such self-service cloud services 100A-110 (e.g., VCLOUD EXPRESS brand self-service cloud services from Terramark, ELASTIC COMPUTE CLOUD (EC2) brand self-service cloud services from Amazon, etc.) generally offer access to those cloud resources 122 at hourly rates so that those cloud resources 122 may be purchased on an as-needed. Accordingly, each of the cloud services 110A-110C may further comprise functionality for providing different levels of support for provisioning those cloud resources 122 and tracking the usage of those cloud resources 122 (e.g., VCLOUD DIRECTOR brand cloud resource management functionality from VMware, APPLOGIC brand cloud resource management functionality from CA Technologies, etc.). To support that functionality, each of the cloud services 110A-110C may comprise a processor, memory, and network interface similar to those described above with respect to the lab management workstation 104 and the DCM server 106. The DCM portal 102 may provide similar functionality for provisioning and/or tracking those cloud resources 122, as well as the resources of the load test lab 108.

The coordinator server 114 is configured to provision the cloud resources 122 of the cloud services 110A-110C on an as-needed basis to operate as additional vUsers 120C-120H. At the beginning of a load test, for example, the load test may be performed with vUsers 120A and 120B invoked on the simulator servers 116. As those vUsers 120A and 120B begin applying a load to the IT product on the service provider system 112, the coordinator server 114 monitors the simulator servers 116 to determine their remaining capacity and the number of vUsers 120A and 120B that are running on those simulator servers 116. The coordinator server 114 then analyzes that information and predicts the number of additional vUsers 120C-120H, the number of additional cloud resources 122 that will be required to generate the target load (e.g., 100,000 users), and the amount of time that remains before those additional cloud resources 122 will be required. Based on the results of that predictive analysis, the coordinator server 114 then will begin provisioning those additional cloud resources 122 to operate as additional vUsers 120C-120H, before the need arises for them. In that manner, the coordinator server 114 may dynamically "ramp up" or "ramp down" the load applied to the IT product by incrementally adding or removing cloud resources 122, respectively, as a load test progresses.

The coordinator server 114 is configured to provision the cloud resources 122 of the cloud services 110A-110C by initializing one or more of the corresponding cloud resources 122, pushing vUser scripts and test assets to those cloud resources 122, and registering those resources for use with the load test lab 108. Either the functionality of the DCM portal 102 or the functionality of the cloud services 110A-110C may be utilized to configure the cloud resources 122 of the one or more cloud services 110A-110C to execute those vUser scripts to invoke a plurality of instances of vUsers 120C-120H. Further, the test assets provide the instructions based on which those vUsers 120C-120H performed the tasks required to simulate the expected behavior of actual consumers (e.g., inputting usernames and passwords, uploading/ downloading data, navigating between web pages, etc.). The test assets also may provide instructions for determining and monitoring various load parameters at each provisioned cloud resource 122 (e.g., number of CPUs, units of work being performed, load average, etc.). And after the cloud resources 122 of the one or more cloud services 110A-110C are provisioned in that manner, the coordinator server 114 instructs the one or more cloud services 110A-110C to begin incrementally adding instances of those vUsers 120C-120H to the load test.

Like the simulator servers 116, a single cloud resource 122 on each of the cloud services 110A-110C may execute a plurality of such scripts to invoke a plurality of instances of vUsers 120C-120H. And as noted above, invoking a plurality of instances of vUsers 120C-120H in that manner not only reduces the number of computing devices required to conduct a load test, it also eliminates the need for actual users to perform the tasks required to simulate the expected behavior of actual consumers. In FIG. 1, for example, each of the vUsers 120A and 120B invoked by the simulator servers 116 may simulate the behavior of five thousand (5,000) consumers (i.e., 5,000 instances of vUsers), each of the vUsers 120C and 120D invoked by the first cloud service 110A may simulate the behavior of fifteen thousand (15,000) consumers (i.e., 15,000 instances of vUsers), each of the vUsers 120E and 120F invoked by the second cloud service 110A may simulate the behavior of ten thousand (10,000) consumers (i.e., 10,000 instances of vUsers), and each of the vUsers 120G and 120H invoked by the first cloud service 110A may simulate the behavior of twenty thousand (20,000) consumers (i.e., 20,000 instances of vUsers). As a result, the load testing system 100 depicted in FIG. 1 is configured to simulate the load of one hundred thousand (100,000) consumers (i.e., 100,000 instances of vUsers) accessing an IT product on the service provider system 112.

In addition, by provisioning the cloud resources 122 of the one or more cloud services 110A-110C before they actually are required, based on predictive analysis, the load testing system 100 ensures that enough vUsers 120A-120H are available to provide additional load to an IT product as a load test begins to ramp up that load, such that the load test need not be restarted if the initial load is not sufficient to reach the desired performance goal of the IT product. Moreover, by accessing those additional cloud resources 122 on an as-needed basis from the cloud services 110A-1100C, the load testing system 100 reduces the costs associated with performing such a load test while, at the same time, ensuring that there will be sufficient resources to generate virtually any amount of load.

The service provider system 112 is configured to provide one or more IT products for consumption by a plurality of consumers. Such IT products may include, for example, an application, a website, a virtual machine, a server, or any other technology that may be deployed in a computing network. Accordingly, the service provider system 112 also may comprise a processor, memory, and network interface, similar to those described above with respect to the lab management workstation 104 and the DCM server 106.

In order to ensure that such IT products will function properly when released for consumption, IT product providers generally test those IT products prior to their release. In the disclosed load testing system 100, those tests are performed as a service provided via a private cloud that comprises the DCM portal 102, lab management workstation 104, DCM server 106, and load test lab 108. Although the load test lab 108 may provision vUsers 120A and 120B within that private cloud, it also may provision vUsers 120C-120H from self-service, public cloud services 110A-110C, such that the load testing system 100 may operate as a hybrid cloud environment. And because those additional vUsers 102C-120H are provisioned through the private cloud, the service provider system 112 remains protected by the security and privacy of the private cloud.

Figure 2A:
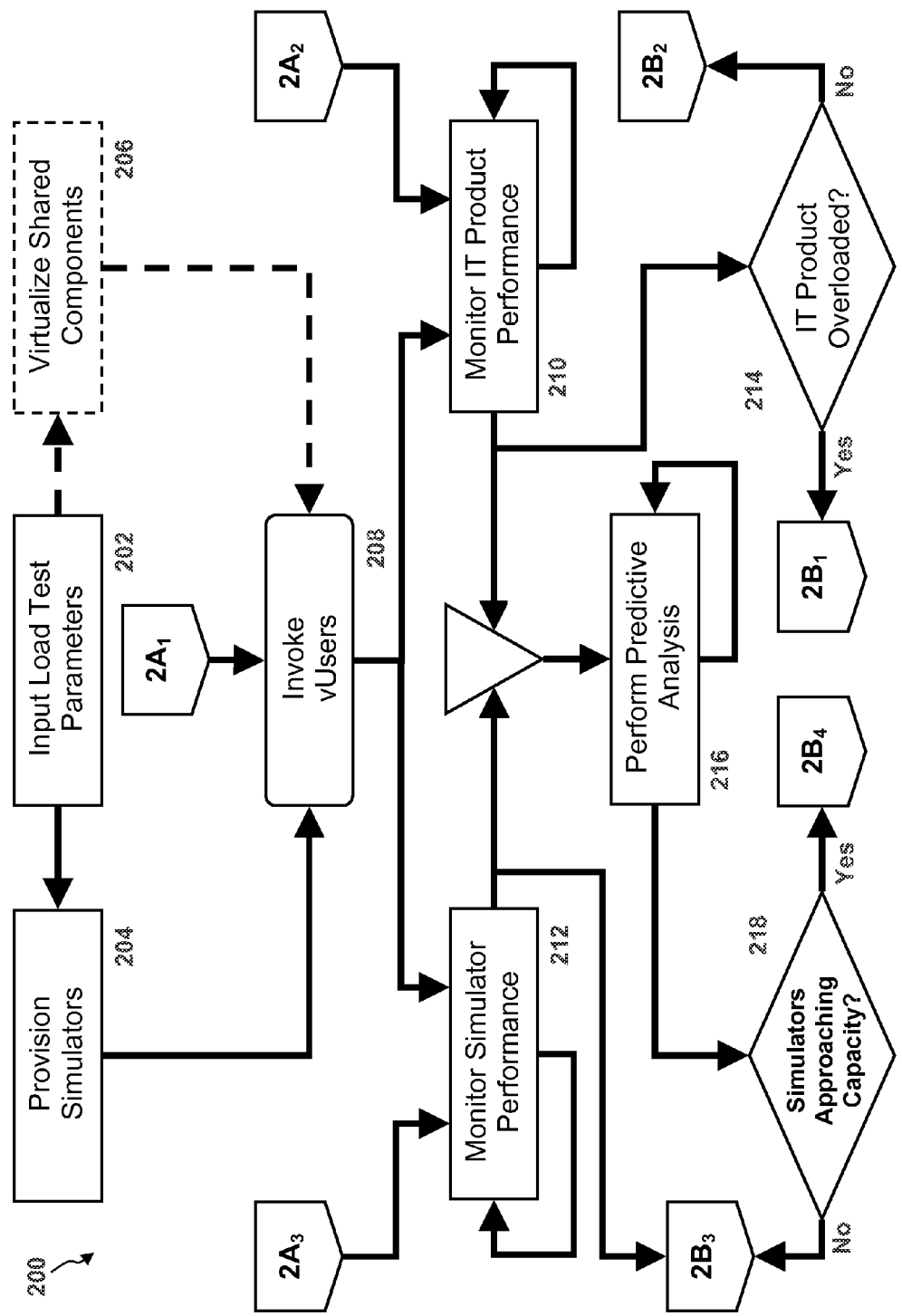
FIG. 2 is a flow diagram illustrating an example of a testing and scaling process according to a non-limiting embodiment of the present disclosure.
Figure 2B:
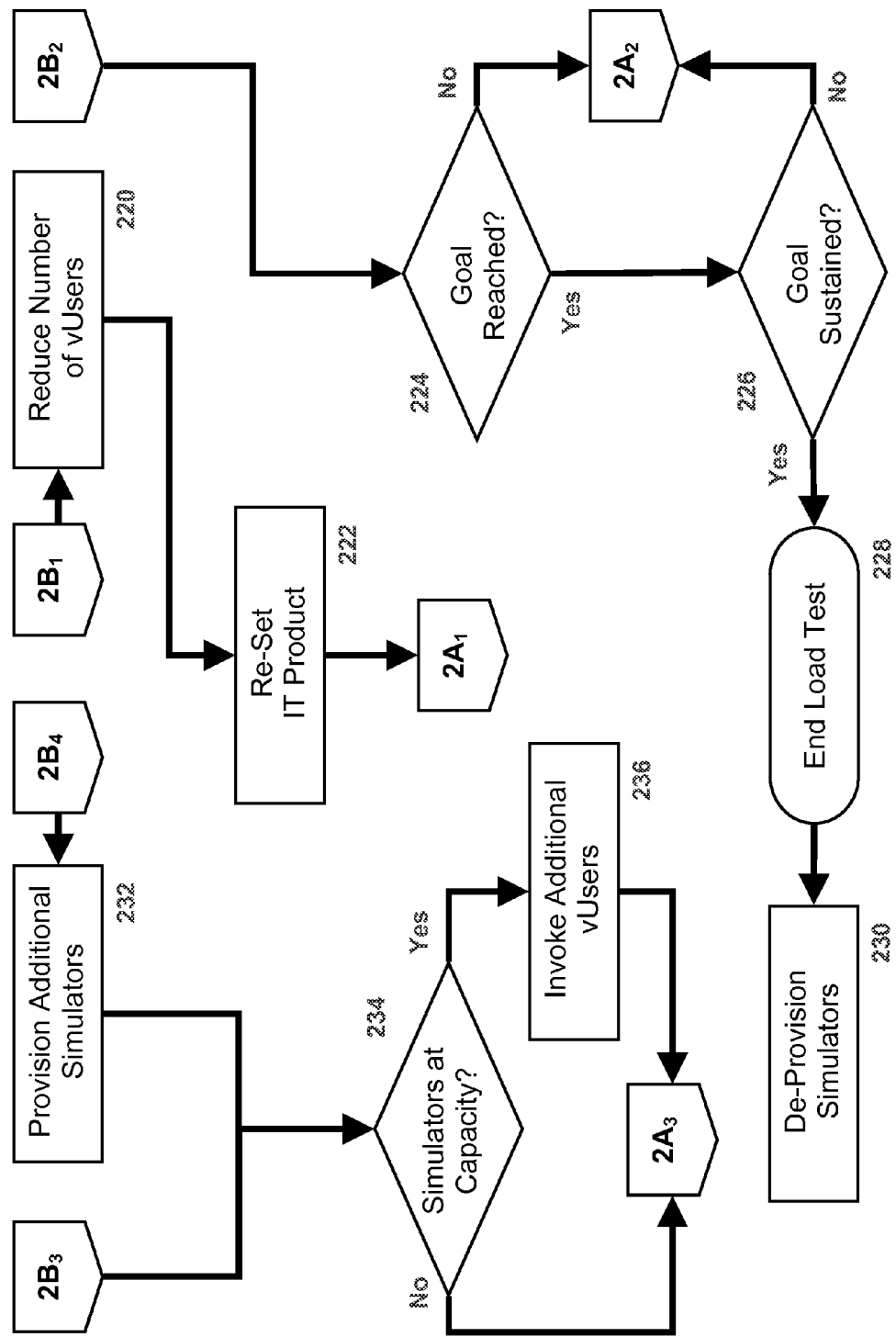

Turning to FIG. 2, an example of a testing and scaling process 200 that may be implemented via the load testing system 100 of FIG. 1 is illustrated. At step 202, the test engineer inputs the various load test parameters. Those test parameters may include, for example, the performance goals of the IT product sought to be achieved by the load test (e.g., CPU usage, memory usage, disk I/O, response time, throughput, etc.), the test period during which those performance goals are to be sustained (e.g., thirty (30) minutes, four (4) hours, two (2) days, etc.), the number of vUsers 120 expected to achieve those performance goals (e.g., 100,000 vUsers), the test assets that define the tasks that are to be performed by those vUsers 120 (e.g., instructions for inputting usernames and passwords, uploading/downloading data, navigating between web pages, etc.), and the components of the load test lab 108 expected to be required to perform the load test (e.g., number of simulator servers 116, components to be virtualized with the VSE server 118, etc.). Also at step 202, the test engineer may define new vUser scripts and/or select from existing vUser scripts that may be executed to perform the tasks defined by those test assets. And the test engineer may access and implement that functionality via the lab management workstation 104, such as by inputting information with a keyboard and/or selecting different options with a mouse.

It should be understood that different test assets and vUser scripts may be generated as part of the same load test so that different vUsers may mimic different, disparate behaviors. In other words, a load test may comprise a suite of test assets and vUser scripts that are configured to mimic a variety of different consumers and consumer behaviors. Such variety mimics the variety that exists in real-world applications and allows the load testing system 100 to more accurately simulate the behaviors that are expected to be seen from actual consumers when the IT product is released for consumption.

At step 204, the test assets and vUser scripts are transmitted from the lab management workstation 104 to the DCM server 106, which then provisions them to the simulator servers 116 in a load test lab 108 and/or to the cloud resources 122 in one or more cloud services 110A-110C. Because the test assets and vUser scripts may not have been run on a particular IT product before, the DCM server 106 may not know in advance exactly how many simulator servers 116 and/or cloud resources 122 will be required to generate the desired number of vUsers 120. Accordingly, the DCM server 106 either will select the number of simulator servers 116 and/or cloud resources 122 to be a number known to be less than that required the desired number of vUsers 120, or it will select the number of simulator servers 116 and/or cloud resources 122 to be a number predicted to be as close as possible to that required the desired number of vUsers 120 based on information logged from past load tests. In the former instance, the coordinator server 114 then will ramp up the number of number of simulator servers 116 and/or cloud resources 122 until the performance goal of the IT product is reached; and in the latter instance, the coordinator server 114 may either ramp up or ramp down the number of simulator servers 116 and/or cloud resources 122 if the performance goal of the IT product is not reached by the predicted number.

Although FIG. 1 depicts vUsers 102A and 102B that are invoked at the simulator servers 116 in a load test lab 108 in combination with vUsers 102C-102H that are invoked at the cloud resources 122 in a plurality of cloud services 110A-110C, it should be understood that other configurations also may be utilized. For example, the load test lab 108 may not include or utilize any simulator servers 116 such that the DCM server 106 only invokes vUsers 102C-102H on the cloud resources 122 of the cloud services 110A-110C. Or the DCM server 106 may only invoke vUsers 102E and 102F at one cloud service 110B, rather than at a plurality of cloud services 110A-110C. As yet another alternative, different simulator servers 116 in the same load test lab 108 and/or different cloud resources 122 one or more of cloud services 110A-110C may be provisioned to perform different load tests simultaneously on different IT products on different service provider systems 112 because the use of such resources not only allows a test environment to be quickly and easily scaled, it also allows the simultaneous generation of multiple test environments.

At step 206, the VSE server 118 may virtualize any number of components that are required to implement the IT product that is to be targeted with the load test. For example, one or more components may be shared with other IT products provided by the service provider system 112, and the IT product provider may not want that other IT product to be effected by the load test. Or a particular component may not be available due to project scheduling or security concerns, or even because it has not yet been built. In either instance, the VSE server 118 may model and simulate the subject components for testing purposes. Such virtualizations may also be utilized to model and simulate an entire IT product so that the service provider system 112 need not be accessed to perform the load test and/or to allow multiple test environments to be generated and tested simultaneously. They also allow test environments to be modified as needed to suit specific tests. Nevertheless, a load test may be performed directly one or more IT products and/or on one or more service provider systems 112 without any virtualizations. Accordingly, step 206 may be an optional step, as depicted by the dashed lines with which that step is illustrated in FIG. 2.

At step 208, the coordinator server 114 invokes an initial number of vUsers (e.g., 120A-120D) at the provisioned simulator servers 116 and/or cloud resources 122 to begin performing the load test and then gradually increases that number as the load test progresses. As described above, each of those vUsers 120A-120D applies a load to the IT product by accessing that IT product and performing tasks that mimic those expected to be performed by actual consumers. Such tasks may include, for example, logging on to a web site with a username and password, uploading/downloading data, navigating between web pages, and other tasks that place load on the IT product. In order to more accurately simulate the tasks expected to be performed by actual consumers, the vUsers may perform those tasks sporadically, rather than constantly, just as an actual consumer would do when, for example, browsing a web page. Because those tasks are performed sporadically, each of the provisioned simulator servers 116 and/or cloud resources 122 may generate a large number of vUsers by performing the tasks of one vUser between the tasks of other vUsers, thereby maximizing the capacity of the provisioned simulator servers 116 and/or cloud resources 122 to generate vUsers.

At steps 210 and 212, the coordinator server 114 monitors the performance of the IT product and the provisioned simulator servers 116 and/or cloud resources 122, respectively. More specifically, the coordinator server 114 continuously monitors the IT product to determine whether it has been overloaded or whether it has reached its performance goals at step 210 by monitoring such things as CPU usage, memory usage, disk I/O, response time, and throughput as vUsers 120A-120D apply load to that IT product. And the coordinator server 114 continuously monitors the provisioned simulator servers 116 and/or cloud resources 122 to determine how much of their capacity is being used and how much of their capacity remains as those simulators apply load to the IT product. The data taken at step 210 then is used at step 214 to determine whether the IT product was overloaded by the initial number of vUsers invoked, and the data taken at both step 210 and step 212 is combined and utilized to continuously perform predictive analysis at step 216. The results of that predictive analysis then are used at step 218 to determine whether the provisioned simulator servers 116 and/or cloud resources 122 are approaching their capacity the number of vUsers invoked increases.

If the coordinator server 114 determines at step 214 that the IT product has been overloaded by the load generated with the initial number of vUsers 120A-120D (i.e., Step 214=Yes), the coordinator server 114 will reduce the initial number of vUsers 120A-120D at step 220. If the IT product has been overloaded by exceeding the performance goals set at step 202 but still is operating correctly, the coordinator server 114 may, for example, utilize the data obtained at step 212 to determine how much load was applied by the various vUsers 120A-120D invoked at step 208 and reduce the initial number of vUsers 120A-120D by an amount sufficient to reduce the load to the level required to achieve the desired performance goals. And if the IT product has exceeded the performance goals to the point that it no longer is operating correctly, the coordinator server 114 may reduce the initial number of vUsers 120A-120D by a predetermined amount, such as one third or one half, before re-setting the IT product at step 222. That predetermined amount also may be based on the data obtained at step 212. The coordinator server 114 then will invoke that new number of vUsers (e.g., 120A and 120B) at step 208, which continues and/or restarts the load test.

If the coordinator server 114 determines at step 214 that the IT product has not been overloaded by the load generated with the initial number of vUsers 120A-120D (i.e., Step 214=No), the coordinator server 114 then determines whether the performance goal was reached with the initial number of vUsers 120A-120D at step 224. If the coordinator server 114 determines at step 224 that the IT product has reached the performance goals set at step 202 (i.e., Step 224=Yes), the coordinator server 114 then determines whether the load that has met those the performance goals has been sustained for the required test period at step 226. And if the coordinator server 114 determines at step 224 that the IT product has not reached the performance goals set at step 202 (i.e., Step 224=No) and/or those performance goals have not been sustained for the required test period (i.e., Step 226=No), testing and scaling process 200 will continue in a cyclical manner until the coordinator server 114 determines at step 224 that the IT product has reached those performance goals (i.e., Step 224=Yes) and determines at step 226 that those performance goals have been sustained for the required test period (i.e., Step 226=Yes).

When the coordinator server 114 determines that the IT product has sustained the required performance goals for the required test period (i.e., Step 224=Yes; Step 226=Yes), the load test then will end at step 228 by de-invoking the vUsers 120A-120H. And after the load test is ended at step 228, the provisioned simulator servers 116 and cloud resources 122 are de-provisioned at step 230. Thus, after the provisioned simulator servers 116 and cloud resources 122 are de-provisioned at step 230, the load testing system 200 may be re-configured to run a different load test on a different IT product.

In order to meet the performance goals set at step 202 when they are not met by the initial number of vUsers 120A-120D invoked at step 208, the predictive analysis performed at step 216 utilizes a metric profile that is unique to the load test being run to predict when a provisioned simulator server 116 and/or cloud resource 120 will run out of capacity to generate additional load (i.e., additional instances of individual vUsers). The predictive analysis performed at step 216 also predicts the number of additional vUsers (e.g., 120C-120H), and therefore the number of additional simulator servers 116 and/or cloud resources 120, that will be required to meet the performance goals set at step 202 based on the current load being generated by the invoked vUsers 102A-102D on the provisioned simulator servers 116 and/or cloud resources 120 and their remaining capacity.

The algorithm utilized by the coordinator server 114 to perform that predictive analysis is based on the CPU load and memory usage versus the maximum memory that can be allocated for each of the provisioned simulator servers 116 and/or cloud resources 120, as well as the load average. The load average is the average number of processes and/or computational threads on a particular provisioned simulator server 116 and/or cloud resource 120 that is in the running state, or that is in the runnable state (i.e., the state of waiting to be put into the running state without waiting for other resources in a preceding interval). For example, a load average of three (3) would mean that, in a preceding interval (e.g., the past thirty (30) seconds), there were on average three (3) running and/or runnable units of work at any given point in time. That data, which also includes the load being placed on the provisioned the simulator servers 116 and/or cloud resources 120 by running the load test, is obtained at step 212. And by comparing that data with the data obtained at step 210, which includes the performance characteristics of the IT product as load placed on it by on the provisioned the simulator servers 116 and/or cloud resources 120, the coordinator server 114 may predict the amount by which the load testing system 100 should be scaled up or scaled down to achieve the desired load on the IT product.

The algorithm utilized by the coordinator server 114 to perform predictive analysis at step 216 is based, at least in part, on the total number of CPUs and the measured load average across all of the provisioned simulator servers 116 and/or cloud resources 120 to ensure that the loads placed on those simulator servers 116 and/or cloud resources 122 do not overstep the capacity of those devices. More specifically, the load average is based not only on the number of processes and/or computational threads that are being run by the CPUs on the provisioned simulator servers 116 and/or cloud resources 120, but also on the number of processes and/or computational threads that those CPUs may be running to perform tasks that are not related to the load test being implemented with those provisioned simulator servers 116 and/or cloud resources 120.

If each CPU in a cloud resource 122 is configured to perform one (1) unit of work, that cloud resource 122 comprised four (4) CPUs, and the coordinator server 114 determined that the subject cloud resource 122 was contributing one (1) unit of work to a load test, but was unaware of the work being utilized to perform other tasks (e.g., two (2) units of work), the predicted capacity of that cloud resource 122 (e.g., three (3) units of work) could overstep the actual remaining capacity of that cloud resource 122 (e.g., two (2) units of work). The test assets of each provisioned cloud service 122 then determine and utilize its load average (e.g., three (3) units of work) to determine its actual remaining capacity (e.g., one (1) unit of work) so that the coordinator server 114 is aware not only of the work being utilized to perform the load test (e.g., one (1) unit of work), but also is aware of the work being utilized to perform other tasks (e.g., two (2) units of work). Each cloud resource 122 determines its own load average and capacity in isolation to provide a resource-by-resource view of the capacity of the load test lab 108. The coordinator server 114, therefore, may more accurately predict the remaining capacity of the load test lab 108, as well as each individual cloud resource 122.

For example, the coordinator server 114 may query the provisioned simulator servers 116 and/or cloud resources 122 at step 212 and determine that each of two (2) provisioned simulator servers 116 comprises three (3) CPUs and that each of two (2) provisioned cloud resources 122 comprises four (4) CPUs, wherein each of those CPUs is configured to perform one (1) unit of work. The coordinator server 114 may further determine that each of the CPUs of the provisioned simulator servers 116 currently is invoking approximately fourteen hundred (1,400) instances of vUsers 120A and 120B, each of the CPUs of the provisioned cloud resources 122 currently is invoking approximately twenty-three hundred (2,300) instances of vUsers 120C and 120C, and the load average across those provisioned simulator servers 116 and cloud resources 122 is approximately 2.4 units of work. Accordingly, the coordinator server 114 then may perform predictive analysis at step 216 and determine that each of the two (2) provisioned simulator servers 116 is at 80% capacity (i.e., 2.4 units of work/(3 CPUs×1 unit of work)=0.8) and that each of the two (2) provisioned cloud resources 122 is at 60% capacity (i.e., 2.4 units of work/(4 CPUs×1 unit of work)=0.6), such that each of the two (2) provisioned simulator servers 116 will approach its capacity for generating load as the number of vUsers 102A and 102B invoked by each of those simulator servers 116 approaches five thousand (5,000) instances (i.e., (3 CPUs×1,400 instances)/0.8=5,250) and that each of two (2) provisioned cloud resources 122 will approach its capacity for generating load as the number of vUsers 102C and 102D invoked by each of those cloud resources 122 approaches fifteen thousand (15,000) instances (i.e., (4 CPUs×2,300 instances)/0.6=15,333). Based on that determination, the coordinator server 114 then may predict that approximately four (4) additional cloud resources 122 will need to be provisioned to invoke sixty thousand (60,000) more instances of vUsers 120E-120H (i.e., 60,000/15,000=4).

In that example, the numbers five thousand (5,000) and fifteen thousand (15,000) are less than the actual numbers of vUsers 120A-120D at which the provisioned simulator servers 116 and cloud resources 122 may reach their respective capacities (i.e., 5,250 and 15,333) to provide a factor of safety that ensures that those devices are not overloaded. Also in that example, the number of additional cloud resources 122 that need to be provisioned is based on the assumption that those additional cloud resources 122 have the same capacity as the provisioned cloud resources 122. Nevertheless, the numbers utilized to determine when the provisioned simulator servers 116 and cloud resources 122 are approaching their respective capacities also may be the numbers at which those devices actually will reach their respective capacities, and the number of additional cloud resources 122 that need to be provisioned may be based on past utilization of those same cloud resources 122, such that the coordinator server 114 may determine if one cloud service 122 has a different capacity than another cloud service 122.

Based on the foregoing determinations and the other data obtained at steps 210 and 212, the coordinator server 114 also may determine the amount of time it will take for each of the two (2) provisioned simulator servers 116 and each of the two (2) provisioned cloud resource 122 to reach its capacity at the current rate at which additional vUsers are being invoked as the load test progresses. Thus, when any one (1) of the provisioned simulator servers 116 or provisioned cloud resource 122 is determined to be approaching its capacity at step 218 (i.e., Step 218=Yes), the coordinator server 114 may begin provisioning additional cloud resources 120E-120H at step 232 with sufficient time for them to be initialized and added to the load test lab 108 before the provisioned simulator servers 116 or provisioned cloud resource 122 actually reaches its capacity.

Although the particular limits and constants that are utilized by the coordinator server 114 to perform predictive analysis may have predetermined default values that are selected to prevent the IT product from being overloaded. For example, those values may be selected based on data obtained from previous load tests. It also may be possible for a test to override the calculations performed by the coordinator server, such as by setting the number of instances of vUsers 120 that a provisioned simulator server 116 and/or cloud resource 122 may invoke, rather than querying that provisioned simulator server 116 and/or cloud resource 122 to determine how many more instances of vUsers 120 it may invoke. Because overriding the calculations performed by the coordinator server 114 in that manner does not take into account CPU and memory usage, however, there is a greater risk that the subject simulator server 116 and/or cloud resource 122 will fail. Moreover, the number of instances of vUsers 120A-120H an individual simulator server 116 and/or cloud resource 122 may invoke will vary depending on the nature of the load test being performed and the hardware deployed on that simulator server 116 and/or cloud resource 122. Accordingly, the predictive analysis performed at step 216 addresses both of those potential issues.

Further, although the foregoing example describes the algorithm utilized by the coordinator server 114 at step 216 as being applied at a resource-by-resource level, it should be understood that the algorithm also may be utilized at higher levels. For example, the algorithm may be utilized at the whole infrastructure capacity level to spread the load among the available cloud services 110A-110C. In other words, the same algorithm may be utilized not only to determine the capacity of individual cloud resources 122 and to balance load across those cloud resources 122 at a resource-by-resource level, it also may be utilized to determine the capacity of each of the cloud services 110A-110C and to balance load across those cloud services 110A-110C at a cloud service-by-cloud service level. Similarly, the algorithm may be applied at a lower level at each cloud resource 122, such as a component-by-component level. And by performing the corresponding analysis at each of those levels concurrently, the coordinator server 114 is able to obtain a more accurate picture of the behavior of the load test lab 108 during the testing and scaling process 200.

At step 232, additional cloud resources 122 are provisioned by initializing one or more of the cloud services 110B and 110C, pushing vUser scripts and test assets to those cloud resources 122, and registering those resources for use with the load test lab 108. Because such provisioning may take a minute or more, the predictive analysis performed at step 216 determines when those additional cloud resources 122 will be needed far enough in advance to allow provisioning to be completed before that need actually arises, as described above. Such preemptive provisioning at step 232 allows the load test to be scaled up while it continues to run, thereby eliminating costly delays that may otherwise be caused by stopping the load test to provision and add those additional resources, to re-set the IT product, and/or re-run the load test.

After the coordinator server 114 begins provisioning additional cloud resources 120E-120H at step 232, or when none of the provisioned simulator servers 116 or provisioned cloud resource 122 is determined to be approaching its capacity at step 218 (i.e., Step 218=No), the testing and scaling process 200 continues in a cyclical manner through to step 234 and back to step 212 until the coordinator server 114 determines at step 234 that one (1) or more of the provisioned simulator servers 116 and provisioned cloud resource 122 is at its capacity (i.e., Step 218=No; Step 234=Yes). If it previously was determined that any one (1) of the provisioned simulator servers 116 or provisioned cloud resource 122 was approaching its capacity such that additional cloud resources were provisioned at step 232, the coordinator server 114 will then begin invoking new instances of the additional vUsers 120E-120H at step 236 and increase the number of instances invoked as the load test progresses. And if it previously was determined that none of the provisioned simulator servers 116 or provisioned cloud resource 122 was approaching its capacity such that no additional cloud resources were provisioned at step 232, the testing and scaling process 200 returns to step 212 and continues monitoring the performance of the provisioned simulator servers 116 and cloud resources until one (1) is approaching its capacity.

If it is determined at step 234 that none of the provisioned simulator servers 116 or provisioned cloud resource 122 has reached its capacity (i.e., Step 234=No), the testing and scaling process 200 also returns to step 212 and continues monitoring the performance of the provisioned simulator servers 116 and cloud resources until one (1) is approaching its capacity (i.e., Step 218=Yes) and/or has reached its capacity (i.e., Step 234=Yes). The testing and scaling process 200 also will continue monitoring the performance of the IT product during that time period to facilitate determining whether the IT product is overloaded at step 214, to facilitate further predictive analysis at step 216, and to facilitate determining whether the IT product has reached the performance goal at step 224. Accordingly, the load test may be ended at step 228 as soon as enough instances of vUsers 120A-120H have been invoked to meet the performance goals of the IT product, which may occur either before the predicted number of instances are invoked at step 236 and/or before any of the provisioned simulator servers 116 and/or cloud resources 122 reaches its predicted capacity. In other words, steps 208-214 and 220-226 continue in a cyclical manner concurrently with steps 212, 216, 218, and 232-236 until the IT product is determined at steps 224 and 226 to have reached and sustained the performance goals, after which point the load test ends at step 228.

When the load test is ended at step 228, the provisioned simulator servers 116 and cloud resources 122 are de-provisioned at step 230. Because such cloud services 122 generally are charged by the hour, de-provisioning them at step 230 prevents further charges from being incurred when those resources no longer are needed for a particular load test. Accordingly, the coordinator server 114 also may monitor the use of those cloud services 122 at step 212 so that those charges may be passed along to the IT product provider for whom the load test was performed.

The schematic diagram and flow diagram depicted in FIGS. 1 and 2 illustrate the architecture, functionality, and operation of possible implementations of systems, methods, and computer program products according to various aspects of the present disclosure. In that regard, each block in the block diagram or flow chart may represent a module, segment, or portion of code, which comprises one or more executable instructions for implementing the specified logical function(s). It also should be noted that, in some alternative implementations, the functions described in the block may occur out of the order depicted in the figures. For example, two blocks shown in succession may, in fact, be executed substantially concurrently, or the blocks may sometimes be executed in the reverse order, depending upon the functionality involved. It also will be noted that each block of the block diagrams and/or flowchart, and combinations of blocks in the block diagrams and/or flowchart, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An apparatus comprising one or more processors that are configured to execute computer-readable program code to:
    generate a load on a computing product with one or more first load generators;
    increase the load generated by the one or more first load generators over time until the one or more first load generators reach their capacity for generating load;
    monitor the capacity of the one or more first load generators to generate additional load as the load is increased;
    provision one or more second load generators to generate additional load as any of the one or more first load generators approaches its capacity, but before that first load generator reaches its capacity;
    increase the load generated by the one or more second load generators over time until the one or more second load generators reach their capacity for generating load or the computing product reaches a performance goal; and
    continue to provision second load generators until the computing product reaches the performance goal.

2. The apparatus of claim 1, wherein the one or more second load generators comprise one or more resources provisioned from a cloud service.

3. The apparatus of claim 2, wherein generating a load on the computing product comprises invoking virtual users with scripts that mimic the behavior of consumers utilizing the computing product.

4. The apparatus of claim 3, wherein provisioning the one or more second load generators comprises initializing the one or more resources, transmitting the scripts to the one or more resources, and registering the one or more resources to operate with the apparatus.

5. The apparatus of claim 1, wherein:
the computing product is provided on a service provider system that comprises one or more components configured to support the computing product; and
the one or more processors are further configured to execute the computer-readable program code to simulate components of the service provider system.

6. The apparatus of claim 5, wherein the one or more processors are further configured to execute the computer-readable program code to:
simulate components of the service provider system that support another computing product; and
generate a load on the other computing product with one or more resources provisioned from a cloud service.

7. The apparatus of claim 6, wherein the one or more processors are further configured to execute the computer-readable program code to decrease the load generated by at least one of the one or more first load generators and the one or more second load generators until the computing product reaches the performance goal.

8. A method comprising:
generating a load on a computing product with one or more first load generators;
increasing the load generated by the one or more first load generators over time until the one or more first load generators reach their capacity for generating load;
monitoring the capacity of the one or more first load generators to generate additional load as the load is increased;
provisioning one or more second load generators to generate additional load as any of the one or more first load generators approaches its capacity, but before that first load generator reaches its capacity;
increasing the load generated by the one or more second load generators over time until the one or more second load generators reach their capacity for generating load or the computing product reaches a performance goal; and
continuing to provision second load generators until the computing product reaches the performance goal.

9. The method of claim 8, wherein provisioning one or more second load generators comprises provisioning one or more resources provisioned from a cloud service.

10. The method of claim 9, wherein generating a load on the computing product comprises invoking virtual users with scripts that mimic the behavior of consumers utilizing the computing product.

11. The method of claim 10, wherein provisioning the one or more second load generators comprises initializing the one or more resources, transmitting the scripts to the one or more resources, and registering the one or more resources to operate with the apparatus.

12. The method of claim 8, further comprising simulating components of a service provider system that comprises one or more components configured to support the computing product.

13. The method of claim 12, further comprising:
simulating components of the service provider system that support another computing product; and
generating a load on the other computing product with one or more resources provisioned from a cloud service.

14. The method of claim 13, further comprising decreasing the load generated by at least one of the one or more first load generators and the one or more second load generators until the computing product reaches the performance goal.

15. A non-transitory computer program product that is configured to be executed by a processor, the non-transitory computer program product comprising:
computer-readable program code configured to generate a load on a computing product with one or more first load generators;
computer-readable program code configured to increase the load generated by the one or more first load generators over time until the one or more first load generators reach their capacity for generating load;
computer-readable program code configured to monitor the capacity of the one or more first load generators to generate additional load as the load is increased;
computer-readable program code configured to provision one or more second load generators to generate additional load as any of the one or more first load generators approaches its capacity, but before that first load generator reaches its capacity;
computer-readable program code configured to increase the load generated by the one or more second load generators over time until the one or more second load generators reach their capacity for generating load or the computing product reaches a performance goal; and
computer-readable program code configured to continue to provision second load generators until the computing product reaches the performance goal.

16. The non-transitory computer program product of claim 15, wherein the one or more second load generators comprise one or more resources provisioned from a cloud service.

17. The non-transitory computer program product of claim 16, wherein generating a load on the computing product comprises invoking virtual users with scripts that mimic the behavior of consumers utilizing the computing product.

18. The non-transitory computer program product of claim 17, wherein provisioning the one or more second load generators comprises initializing the one or more resources, transmitting the scripts to the one or more resources, and registering the one or more resources to operate with the apparatus.

19. The non-transitory computer program product of claim 15, wherein:
the computing product is provided on a service provider system that comprises one or more components configured to support the computing product; and
the non-transitory computer program product further comprises computer-readable program code configured to simulate components of the service provider system.

20. The non-transitory computer program product of claim 19, further comprising:
computer-readable program code configured to simulate components of the service provider system that support another computing product; and
computer-readable program code configured to generate a load on the other computing product with one or more resources provisioned from a cloud service.

21. The non-transitory computer program product of claim 20, further comprising computer-readable program code configured to decrease the load generated by at least one of the one or more first load generators and the one or more second load generators until the computing product reaches the performance goal.

\* \* \* \* \*